March 8, 1966  O. E. FREHOLM  3,239,032
RAILWAY DISC BRAKE
Filed March 31, 1964

INVENTOR.
OMAR E. FREHOLM
BY
Douglas R. McKechnie
ATTORNEY

United States Patent Office 3,239,032
Patented Mar. 8, 1966

3,239,032
RAILWAY DISC BRAKE
Omar E. Freholm, Jenkintown, Pa., assignor to The Budd Company, Philadelphia, Pa., a corporation of Pennsylvania
Filed Mar. 31, 1964, Ser. No. 356,316
3 Claims. (Cl. 188—59)

This invention relates to railway disc brakes. More particularly, the invention pertains to improvements in disc brakes of the type shown in U.S. Patent 2,955,679, Herbert.

One of the objects of the invention is to provide a disc brake wherein the brake shoe actuating mechanism is adapted to be mounted directly on the truck bolster.

Another object of the invention is to provide a disc brake wherein the brake shoes are supported on a carriage that swings transversely of the truck while being restrained from moving longitudinally relative thereto.

Still another object is to provide a disc brake containing fewer and more compact parts than disc brakes of the type shown in the aforementioned patent.

Other objects and advantages of the invention will be apparent from the following description taken in connection with the accompanying drawing wherein.

Figure 2:
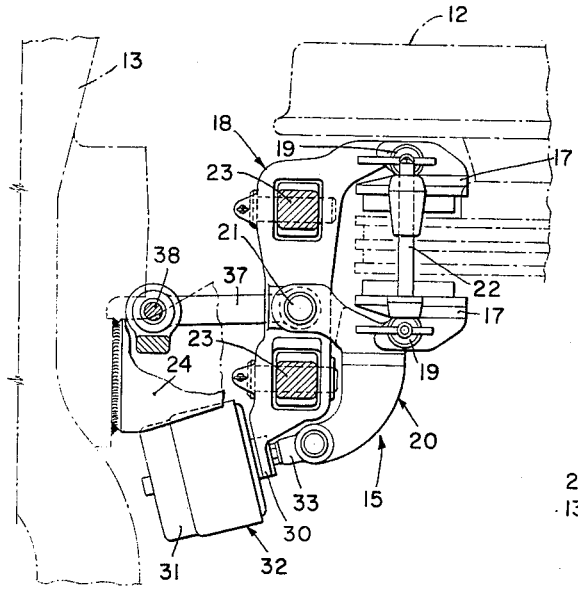
FIG. 2 is an enlarged, top plan detail view, partly in section and with portions removed, of one of the disc brakes shown in FIG. 1.

With reference to the drawing, there is shown a portion of a railway car truck that comprises longitudinal side frames 10 mounted on an axle 11 supported by flanged car wheels 12. The truck further comprises a transverse bolster 13 mounted on the side frames in sprung relationship thereto. The bolster is held at right angles to the side frames by two, longitudinal, parallel, transversely-spaced bolster anchor rods 14 located inboard of the side frames.

Mounted on the truck are two disc brakes 15 that are bilaterally symmetrical about the longitudinal center line of the car. The disc brakes comprise two laterally-spaced, conventional, air cooled brake discs 16 mounted on the inboard sides of wheels 12. Each brake disc 16 is straddled by two transversely-spaced, opposed brake shoes 17, of conventional construction that are adapted, when actuated, to engage the brake discs and frictionally brake rotation thereof.

In each disc brake 15, one brake shoe 17 is pivotally mounted on a carriage 18 by pivot pin 19 and the other brake shoe 17 is pivotally mounted, by a similar pivot pin, on a brake lever 20 pivotally mounted on carriage 18 by a vertical pivot pin 21. The brake shoes are interconnected by a conventional guide 22 that maintains the faces of the brake linings of the brake shoes parallel to each other and to the brake disc. Carriage 18 is supported by two hangers 23 that, in turn, are suspended from a support member 24 welded to bolster 13.

Support member 24 is irregularly shaped and includes a longitudinal portion that extends away from the bolster and a transverse portion provided with two laterally-spaced, oppositely-opening recesses that receive the upper ends of hangers 23. The inboard recess is lower than the outboard recess so the hangers 23, while parallel and of equal length, are vertically displaced or offset to allow removal of the adjacent anchor rod 14.

Carriage 18 comprises two laterally-spaced, vertical bores 25, of rectangular cross section, which receive the lower ends of hangers 23. Pivot pins 26 fasten the hangers 23 to support member 24 and to carriage 18, and cotter pins 27 prevent the pivot pins from falling out. The recesses of support member 24 and bores 25 have clearances that allow swinging movement of hangers 23 and carriage 18 transversely of the truck parallel to axle 11.

Carriage 18 further includes a lug 29, upon which a brake shoe 17 is mounted, and a pair of vertically-spaced tabs 30 upon which is mounted the cylinder 31 of a conventional pneumatic power actuator 32. The actuator further includes a return spring and piston (not shown) and a piston rod 33 that is connected to the end of an actuating arm 35 of lever 20.

Lever 20 further comprises two lugs 36 through which pin 21 extends. The upper lug 36 rests on top of carriage 18 and the lower lug 36 underlies one end of a longitudinal stabilizer rod 37 through which pin 21 passes. The stabilizer rod has its other end pivotally connected by a pin 38 to the underside of support member 24. The lower end of pin 38 is surrounded by a sleeve 39 through which extends a bolt 40 that holds pin 38 in place. Lever 20 is preferably provided with an emergency brake arm 42 which is adapted to be connected to suitable mechanical linkage for manual application of the brakes.

In accordance with the usual practice, all of the pivot pins have sufficient clearances for facilitating assembly within normal variations of manufacturing tolerances. Thus, in the absence of stabilizer rod 37, the carriage could swing longitudinally to a limited extent and it could twist upon the actuation of arm 42. However, stabilizer rod 37 limits this and thereby promotes even wear of the brake linings of brake shoes 17 and prevents any twisting moment from being applied to upper pins 26.

In operation, when pneumatic pressure is supplied to each actuator 32, the piston rod 33 pivots lever 20 about pin 21 causing the brake shoe 17 connected thereto to engage the associated brake disc. Then, with the one brake shoe fixed and acting as a fulcrum, cylinder 31 moves relative to the piston rod and thereby swings carriage 18 transversely until the brake shoe 17 mounted thereon engages the brake disc to clamp the brake disc between the brake shoes with sufficient pressure to frictionally brake rotation of the disc and, hence, of the truck and car. Upon release of the pneumatic pressure, the return spring relieves the braking pressure and moves the brake shoes away from the brake disc. During braking the brake reaction forces are transmitted from the brake shoes 17 and lever 20 into carriage 18 and from thence into support member 24 through hangers 23.

Figure 1:
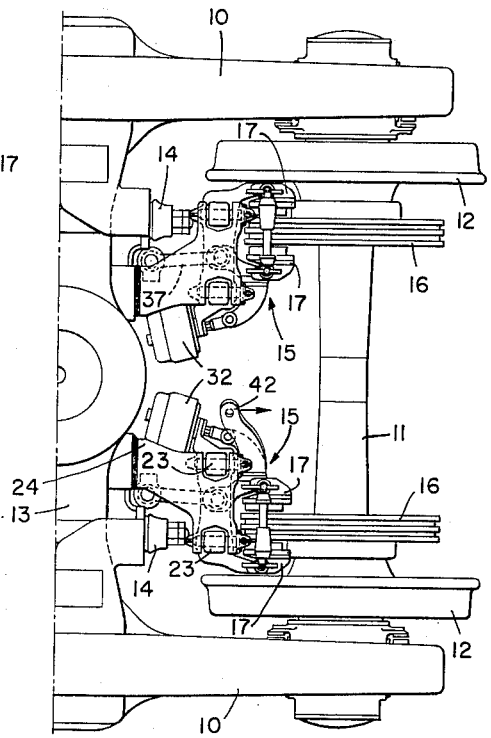
FIG. 1 is a top plan view of a railway car truck provided with disc brakes embodying the invention.
Figure 3:
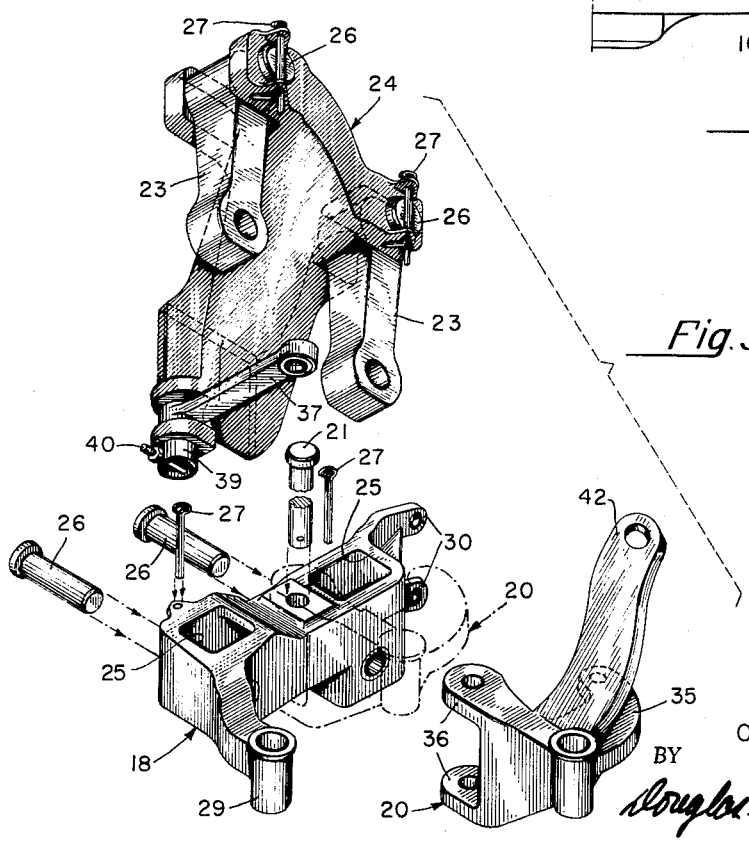
FIG. 3 is an exploded enlarged perspective view of details of the other disc brake shown in FIG. 1.

When arm 42 is actuated, by pulling in the direction of the arrow (FIG. 1), the longitudinal actuating forces are applied to pin 21 and thence to rod 37, which takes up these forces to prevent twisting of the carriage and hangers. The actuating force also produces a moment about pin 21 that pivots the brake shoes 17, first one and then the other in the manner of the preceding paragraph, into engagement with the brake disc.

While only a single embodiment has been illustrated, it will be apparent that many changes can be made in the details and arrangement of parts without departing from the scope of the invention as defined in the appended claims.

What is claimed is:

1. In a railway disc brake, the combination comprising: a support member adapted to be mounted on a truck bolster: a carriage; two parallel, vertical hangers of equal length pivotally connected to said support member and said carriage and supporting said carriage for swinging transverse movement, said support member and one of said hangers being vertically offset to allow removal of an anchor rod from the truck bolster; a first brake shoe mounted on said carriage; a brake lever pivotally mounted on said carriage and including first, second and third arms; a second brake shoe mounted on said first arm; a pneumatic power actuator connected between said second arm and said carriage; said third arm being a brake arm for manually actuating said disc brake; and longitudinal stabilizer rod pivotally connected at its end to said support member and to said carriage for restraining longitudinal movement of said carriage and twisting of said carriage due to actuation of said third arm.

2. The combination of claim 1 including a pivot pin that extends through said carriage, said brake lever and said stabilizer rod and pivotally mounts said brake lever on said carriage and pivotally connects said stabilizer rod to said carriage.

3. In a railway disc brake, the combination of: a support member affixed to a truck bolster; two vertical hanger members pivotally suspended at the upper ends from said support member for swinging movement about parallel longitudinal axes; a carriage pivotally connected to the lower ends of said hanger members for swinging transverse movement about said longitudinal axes; a first brake shoe mounted on said carriage; a stabilizer rod disposed in a plane extending longitudinally between said hanger members and connected at one of its ends to said support member for pivotal movement about an axis normal to said longitudinal axes; a brake lever connected to said carriage between said lower ends of said hanger members and to the other end of said stabilizer rod for pivotal movement about an axis parallel to said normal axis; a second brake shoe mounted to said lever; and power actuator means connected between said carriage and said brake lever to cause relative movement therebetween and corresponding movement of said first and second brake shoes; said stabilizer rod thereby serving to transmit longitudinal loads from said carriage and brake lever to said support member.

References Cited by the Examiner

UNITED STATES PATENTS 2,955,679 10/1960 Herbert _____ 188—59
2,972,314 2/1961 Herbert _____ 188—59 X DUANE A. REGER, *Primary Examiner.*

MILTON BUCHLER, *Examiner.*